United States Patent
Primerano et al.

(10) Patent No.: US 6,885,380 B1
(45) Date of Patent: Apr. 26, 2005

(54) METHOD FOR TRANSFORMING THREE COLORS INPUT SIGNALS TO FOUR OR MORE OUTPUT SIGNALS FOR A COLOR DISPLAY

(75) Inventors: Bruno Primerano, Honeoye Falls, NY (US); Michael E. Miller, Honeoye Falls, NY (US); Michael J. Murdoch, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/703,748

(22) Filed: Nov. 7, 2003

(51) Int. Cl.[7] .............................................. G09G 5/02
(52) U.S. Cl. ..................................... 345/589; 345/82
(58) Field of Search ............................... 345/589, 590, 345/600, 604, 82, 83, 88, 44, 45, 46

(56) References Cited

U.S. PATENT DOCUMENTS

| | | |
|---|---|---|
| 5,341,153 A | 8/1994 | Benzschawel et al. |
| 5,929,843 A | 7/1999 | Tanioka |
| 6,453,067 B1 | 9/2002 | Morgan et al. |
| 2003/0034992 A1 | 2/2003 | Elliott et al. |
| 2004/0178973 A1 * | 9/2004 | Miller et al. ................... 345/82 |
| 2004/0234163 A1 * | 11/2004 | Lee et al. ..................... 382/298 |

OTHER PUBLICATIONS

Lee et al., TFT–LCD with RGBW Color System, *SID 03 Digest*, pp. 1212–1215.

* cited by examiner

*Primary Examiner*—Matthew Luu
(74) *Attorney, Agent, or Firm*—Thomas H. Close

(57) ABSTRACT

A method for transforming three color input signals (R, G, B) corresponding to three gamut defining color primaries to four color output signals (R', G', B', W) corresponding to the gamut defining color primaries and one additional color primary W for driving a display having emitters that emit light corresponding to the to the four color output signals including calculating a common signal value S as a function F1 of the three color input signals (R,G,B) for a current and neighboring pixels; determining a final common signal value S' based upon the common signals for the current and neighboring pixels; calculating the three color signals (R', G',B') by calculating a value of a function F2 of the final common signal value S' and adding it to each of the three color input signals (R,G,B); and calculating the output signal W as a function F3 of the final common signal value S'.

17 Claims, 9 Drawing Sheets

METHOD FOR TRANSFORMING THREE COLORS INPUT SIGNALS TO FOUR OR MORE OUTPUT SIGNALS FOR A COLOR DISPLAY

FIELD OF THE INVENTION

The present invention relates to color processing three color image signals for display on a color OLED display having four or more color primaries.

BACKGROUND OF THE INVENTION

Additive color digital image display devices are well known and are based upon a variety of technologies such as cathode ray tubes, liquid crystal modulators, and solid-state light emitters such as Organic Light Emitting Diodes (OLEDs). In a common OLED color display device a pixel includes red, green, and blue colored OLEDs. These light emitting color primaries define a color gamut, and by additively combining the illumination from each of these three OLEDs, i.e. with the integrative capabilities of the human visual system, a wide variety of colors can be achieved. OLEDs may be used to generate color directly using organic materials that are doped to emit energy in desired portions of the electromagnetic spectrum, or alternatively, broadband emitting (apparently white) OLEDs may be attenuated with color filters to achieve red, green and blue.

It is possible to employ a white, or nearly white OLED along with the red, green, and blue OLEDs to improve power efficiency and/or luminance stability over time. Other possibilities for improving power efficiency and/or luminance stability over time include the use of one or more additional non-white OLEDs. However, images and other data destined for display on a color display device are typically stored and/or transmitted in three channels, that is, having three signals corresponding to a standard (e.g. sRGB) or specific (e.g. measured CRT phosphors) set of primaries. It is also important to recognize that this data is typically sampled to assume a particular spatial arrangement of light emitting elements. In an OLED display device these light emitting elements are typically arranged side by side on a plane. Therefore if incoming image data is sampled for display on a three color display device, the data will also have to be resampled for display on a display having four OLEDs per pixel rather than the three OLEDs used in a three channel display device.

In the field of CMYK printing, conversions known as undercolor removal or gray component replacement are made from ROB to CMYK, or more specifically from CMY to CMYK. At their most basic, these conversions subtract some fraction of the CMY values and add that amount to the K value. These methods are complicated by image structure limitations because they typically involve non-continuous tone systems, but because the white of a subtractive CMYK image is determined by the substrate on which it is printed, these methods remain relatively simple with respect to color processing. Attempting to apply analogous algorithms in continuous tone additive color systems would cause color errors if the additional primary is different in color from the display system white point. Additionally, the colors used in these systems can typically be overlaid on top of one another therefore there is no need to spatially resample the data when displaying four colors.

In the field of sequential-field color projection systems, it known to use a white primary in combination with red, green, and blue primaries. White is projected to augment the brightness provided by the red, green, and blue primaries, inherently reducing the color saturation of some, if not all, of the colors being projected. A method proposed by Morgan et al. in U.S. Pat. No. 6,453,067 issued Sep. 17, 2002, teaches an approach to calculating the intensity of the white primary dependent on the minimum of the red, green, and blue intensities, and subsequently calculating modified red, green, and blue intensities via scaling. The scaling is ostensibly to try to correct the color errors resulting from the brightness addition provided by the white, but simple correction by scaling will never restore, for all colors, all of the color saturation lost in the addition of white. The lack of a subtraction step in this method ensures color errors in at least some colors. Additionally, Morgan's disclosure describes a problem that arises if the white primary is different in color from the desired white point of a display device without adequately solving it. The method simply accepts an average effective white point, which effectively limits the choice of white primary color to a narrow range around the white point of the device. Since the red, green, blue, and white elements are projected to spatially overlap one another, there is no need to spatially resample the data for display on the four color device.

A similar approach is described by Lee et al. in TFT-LCD with RGBW Color System, *SID* 03 *Digest*, pp. 1212–1215, to drive a color liquid crystal display having red, green, blue, and white pixels. Lee et al. calculate the white signal as the minimum of the red, green, and blue signals, then scale the red, green, and blue signals to correct some, but not all, color errors, with the goal of luminance enhancement paramount. The method of Lee et al. suffers from the same color inaccuracy as that of Morgan and no reference is made to spatially resampling of the incoming three color data to the array of red, green, blue and white elements.

In the field of ferroelectric liquid crystal displays, another method is presented by Tanioka in U.S. Pat. No. 5,929,843, issued Jul. 27, 1999. Tanioka's method follows an algorithm analogous to the familiar CMYK approach, assigning the minimum of the R, G, and B signals to the W signal and subtracting the same from each of the R, G, and B signals. To avoid spatial artifacts, the method teaches a variable scale factor applied to the minimum signal that results in smoother colors at low luminance levels. Because of its similarity to the CMYK algorithm, it suffers from the same problem cited above, namely that a white pixel having a color different from that of the display white point will cause color errors. Similarly to Morgan et al. (U.S. Pat. No. 6,453,067, referenced above), the color elements are typically projected to spatially overlap one another and so there is no need for spatial resampling of the data.

While stacked OLED display devices have been discussed in the prior art, providing full color data at each visible spatial location, OLED display devices are commonly constructed from multiple colors of OLEDs that are arranged on a single plane. When displays provide color light emitting elements that have different spatial location, it is known to sample the data for the spatial arrangement. For example, U.S. Pat. No. 5,341,153 issued Aug. 23, 1994 to Benzschawel et al., discusses a method for displaying a high resolution, color image on a lower resolution liquid crystal display in which the light emitting elements of different colors have different spatial locations. Using this method, the spatial location and the area of the original image that is sampled to produce a signal for each light emitting element is considered when sampling the data to a format that provides sub-pixel rendering. While this patent does mention providing sampling of the data for a display device having four different color light emitting elements, it does not provide a method for converting from a traditional three color image signal to an image signal that is appropriate for display on a display device having four different color light emitting elements. Additionally, Benzschawel et al. assumes that the input data originates from an image file that is higher in resolution than the display and contains information for all color light emitting elements at every pixel location.

The prior art also includes methods for resampling image data from one intended spatial arrangement of light emitting elements to a second spatial arrangement of light emitting elements. U.S. Patent Application Publication No. 2003/0034992A1, by Brown Elliott et al., published Feb. 20, 2003, discusses a method of resampling data that was intended for presentation on a display device having one spatial arrangement of light emitting elements having three colors to a display device having a different spatial arrangement of three color light emitting elements. Specifically, this patent application discusses resampling three color data that was intended for presentation on a display device with a traditional arrangement of light emitting elements to three color data that is intended for presentation on a display device with an alternate arrangement of light emitting elements. While it is possible to resample data from one intended spatial arrangement to a logical display with spatially overlapping light emitting elements; performing a conversion from the image three color image signal to a four color OLED display, and then resampling the data to the spatial arrangement of the OLED display; is computationally intensive.

There is a need, therefore, for an improved method for transforming three color input signals, bearing images or other data, to four or more output signals that are not spatially overlapping.

SUMMARY OF THE INVENTION

The need is met by providing a method for transforming three color input signals (R, G, B) corresponding to three gamut defining color primaries to four color output signals (R', G', B', W) corresponding to the gamut defining color primaries and one additional color primary W for driving a display having emitters that emit light corresponding to the to the four color output signals that includes calculating a common signal value S as a function F1 of the three color input signals (R,G,B) for a current and neighboring pixels; determining a final common signal value S' based upon the common signals for the current and neighboring pixels; calculating the three color signals (R',G',B') by calculating a value of a function F2 of the final common signal value S' and adding it to each of the three color input signals (R,G,B); and calculating the output signal W as a function F3 of the final common signal value S'.

ADVANTAGES

The present invention has the advantage of providing an efficient method for transforming a three color input image signal that may have been sampled for display on a display with three spatially non-overlapping light emitting elements to a four or more color image signal in a way that preserves edge information in the OLED display system.

DETAILED DESCRIPTION OF THE INVENTION

The present invention is directed to a method for transforming three color input signals, bearing images or other data, to four or more color output signals for display on an additive display device having four or more color primaries. The present invention is useful, for example, for converting a 3-color RGB input color image signal that has been sampled for display on a display device having three spatially non-overlapping light emitting elements to a four color signal for driving a four-color OLED display device having pixels made up of light emitting elements that each emit light of one of the four colors.

Figure 1:
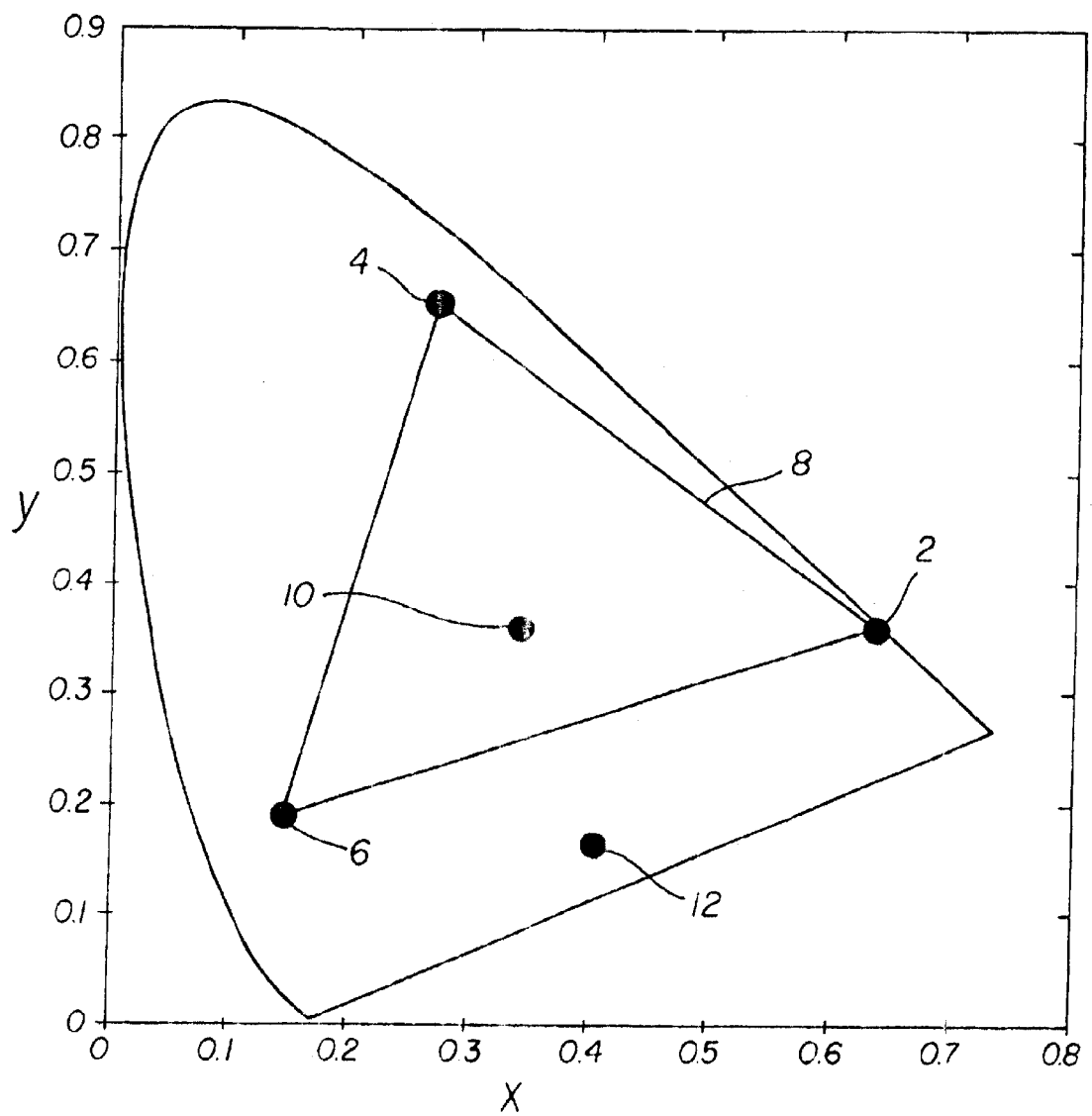
FIG. 1 is a prior art CIE 1931 Chromaticity Diagram useful in describing in-gamut and out-of-gamut colors.

FIG. 1 shows a 1931 CIE chromaticity diagram displaying hypothetical representations of the primaries of the four-color OLED display device. The red primary 2, green primary 4, and blue primary 6 define a color gamut, bounded by the gamut defining triangle 8. The additional primary 10 is substantially white, because it is near the center of the diagram in this example, but it is not necessarily at the white point of the display. An alternative additional primary 12 is shown, outside the gamut 8, the use of which will be described later.

A given display device has a white point, generally adjustable by hardware or software via methods known in the art, but fixed for the purposes of this example. The white point is the color resulting from the combination of three color primaries, in this example the red, green, and blue primaries, being driven to their highest addressable extent. The white point is defined by its chromaticity coordinates and its luminance, commonly referred to as xyY values, which may be converted to CIE XYZ tristimulus values by the following equations:

$$X = \frac{x}{y} \cdot Y$$

-continued $$Y = Y$$

$$Z = \frac{(1-x-y)}{y} \cdot Y$$

Noting that all three tristimulus values are scaled by luminance Y, it is apparent that the XYZ tristimulus values, in the strictest sense, have units of luminance, such as cd/m². However, white point luminance is often normalized to a dimensionless quantity with a value of 100, making it effectively percent luminance. Herein, the term "luminance" will always be used to refer to percent luminance, and XYZ tristimulus values will be used in the same sense. Thus, a common display white point of D65 with xy chromaticity values of (0.3127, 0.3290) has XYZ tristimulus values of (95.0, 100.0, 108.9).

The display white point and the chromaticity coordinates of three display primaries, in this example the red, green, and blue primaries, together specify a phosphor matrix, the calculation of which is well known in the art. Also well known is that the colloquial term "phosphor matrix," though historically pertinent to CRT displays using light-emitting phosphors, may be used more generally in mathematical descriptions of displays with or without physical phosphor materials. The phosphor matrix converts intensities to XYZ tristimulus values, effectively modeling the additive color system that is the display, and in its inversion, converts XYZ tristimulus values to intensities.

The intensity of a primary is herein defined as a value proportional to the luminance of that primary and scaled such that the combination of unit intensity of each of the three primaries produces a color stimulus having XYZ tristimulus values equal to those of the display white point. This definition also constrains the scaling of the terms of the phosphor matrix. The OLED display example, with red, green, and blue primary chromaticity coordinates of (0.637, 0.3592), (0.2690, 0.6508), and (0.1441, 0.1885), respectively, with the D65 white point, has a phosphor matrix M3:

$$M3 = \begin{bmatrix} 56.7 & 16.0 & 22.4 \\ 32.1 & 38.7 & 29.2 \\ 0.545 & 4.76 & 104 \end{bmatrix}$$

The phosphor matrix M3 times intensities as a column vector produces XYZ tristimulus values, as in this equation:

$$M3 \times \begin{bmatrix} I_1 \\ I_2 \\ I_3 \end{bmatrix} = \begin{bmatrix} X \\ Y \\ Z \end{bmatrix}$$

where I1 is the intensity of the red primary, I2 is the intensity of the green primary, and I3 is the intensity of the blue primary.

It is to be noted that phosphor matrices are typically linear matrix transformations, but the concept of a phosphor matrix transform may be generalized to any transform or series of transforms that leads from intensities to XYZ tri stimulus values, or vice-versa.

The phosphor matrix may also be generalized to handle more than three primaries. The current example contains an additional primary with xy chromaticity coordinates (0.3405, 0.3530)—close to white, but not at the D65 white point. At a luminance arbitrarily chosen to be 100, the additional primary has XYZ tristimulus values of (96.5, 100.0, 86.8). These three values may be appended to phosphor matrix M3 without modification to create a fourth column, although for convenience, the XYZ tristimulus values are scaled to the maximum values possible within the gamut defined by the red, green, and blue primaries. The phosphor matrix M4 is as follows:

$$M4 = \begin{bmatrix} 56.7 & 16.0 & 22.4 & 88.1 \\ 32.1 & 38.7 & 29.2 & 91.3 \\ 0.545 & 4.76 & 104 & 79.3 \end{bmatrix}$$

An equation similar to that presented earlier will allow conversion of a four-value vector of intensities, corresponding to the red, green, blue, and additional primaries, to the XYZ tristimulus values that their combination would have in the display device:

$$M4 \times \begin{bmatrix} I_1 \\ I_2 \\ I_3 \\ I_4 \end{bmatrix} = \begin{bmatrix} X \\ Y \\ Z \end{bmatrix}$$

In general, the value of a phosphor matrix lies in its inversion, which allows for the specification of a color in XYZ tristimulus values and results in the intensities required to produce that color on the display device. Of course, the color gamut limits the range of colors whose reproduction is possible, and out-of-gamut XYZ tristimulus specifications result in intensities outside the range [0,1]. Known gamut-mapping techniques may be applied to avoid this situation, but their use is tangential to the present invention and will not be discussed. The inversion is simple in the case of 3×3 phosphor matrix M3, but in the case of 3×4 phosphor matrix M4 it is not uniquely defined. The present invention provides a method for assigning intensity values for all four primary channels without requiring the inversion of the 3×4 phosphor matrix.

The method of the present invention begins with color signals for the three gamut-defining primaries, in this example, intensities of the red, green, and blue primaries. These are reached either from a XYZ tristimulus value specification by the above described inversion of phosphor matrix M3 or by known methods of converting RGB, YCC, or other three-channel color signals, linearly or nonlinearly encoded, to intensities corresponding to the gamut-defining primaries and the display white point.

Figure 2:
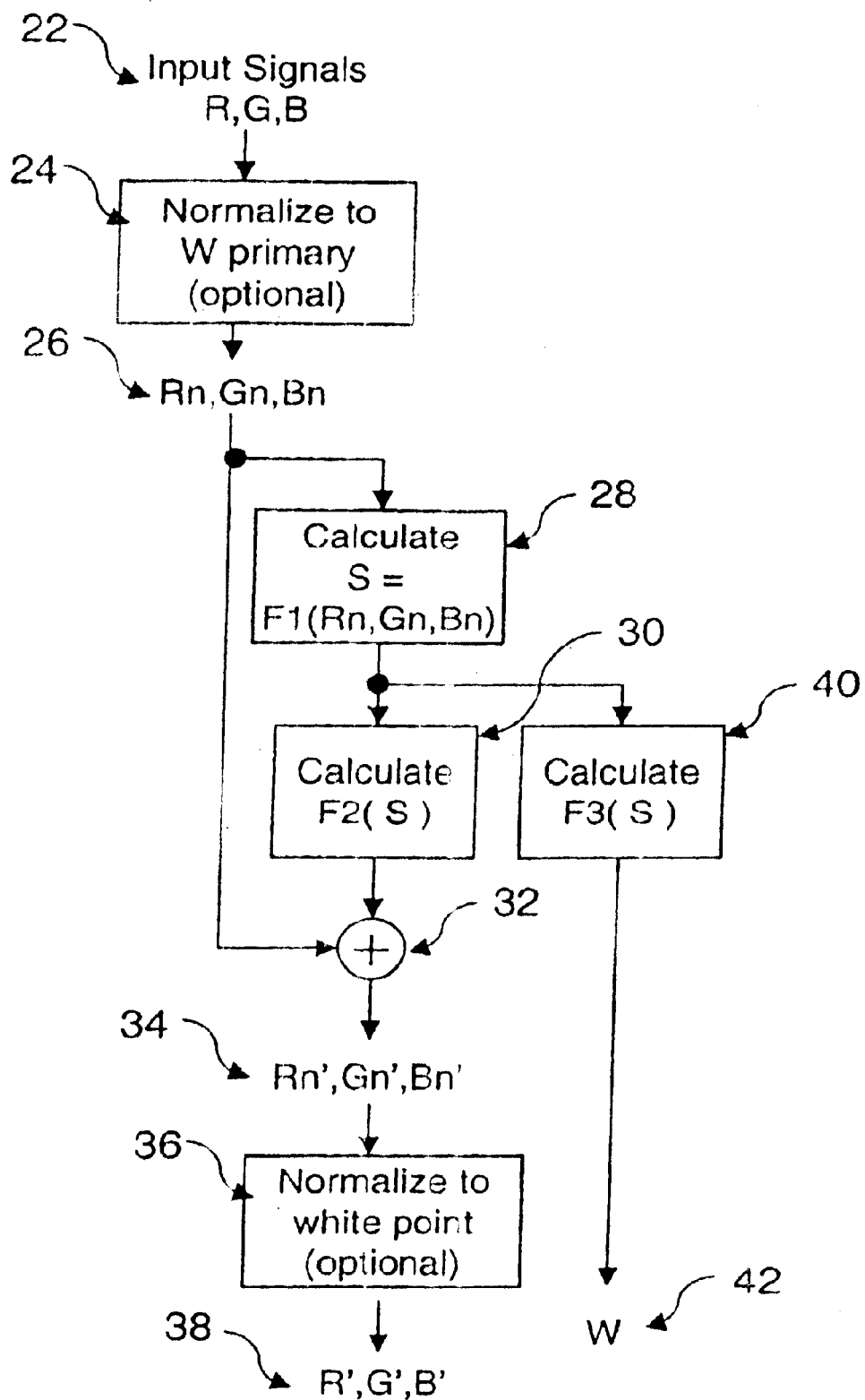
FIG. 2 is a flow diagram illustrating a portion of the method of the present invention.

FIG. 2 shows a flow diagram of the general steps used in the conversion of a three color image signal to four colors. The three color input signals (R,G,B) are input 22 to the display. If the color coordinates of the white material do not match the color coordinates of the display white point, the optional step of normalizing 24 the three color input signals (R,G, B) with respect to the additional primary W. If the optional step of normalizing was not preformed, the values (R,G,B) would be used in the following calculations in place of (Rn,Gn,Bn). Following the OLED example, the red, green, and blue intensities are normalized such that the combination of unit intensity of each produces a color stimulus having XYZ tristimulus values equal to those of the additional primary W. This is accomplished by scaling the red, green, and blue intensities, shown as a column vector, by the inverse of the intensities required to reproduce the color of the additional primary using the gamut-defining primaries:

$$\begin{bmatrix} 1.010 & 0 & 0 \\ 0 & 1.000 & 0 \\ 0 & 0 & 1.400 \end{bmatrix} \times \begin{bmatrix} R \\ G \\ B \end{bmatrix} = \begin{bmatrix} Rn \\ Gn \\ Bn \end{bmatrix}$$

The normalized signals (Rn, Gn, Bn) 26 are used to calculate 28 a common signal S that is a function F1 (Rn, Gn, Bn). In the present example, the function F1 is a special minimum function which chooses the smallest non-negative signal of the three. The common signal S is used to calculate 30 the value of function F2(S). In this example, function F2 provides arithmetic inversion:

$$F2(S) = -S$$

The output of function F2 is added 32 to the normalized color signals (Rn,Gn,Bn), resulting in normalized output signals (Rn',Gn',Bn') 34 corresponding to the original primary channels. If the color coordinates of the white material do not match the color coordinates of the display white point, the optional step of normalizing 36 these signals to the display white point by scaling by the intensities required to reproduce the color of the additional primary using the gamut-defining primaries, resulting in the output signals (R',G',B') which correspond to the input color channels:

$$\begin{bmatrix} 0.990 & 0 & 0 \\ 0 & 1.000 & 0 \\ 0 & 0 & 0.715 \end{bmatrix} \times \begin{bmatrix} Rn' \\ Gn' \\ Bn' \end{bmatrix} = \begin{bmatrix} R' \\ G' \\ B' \end{bmatrix}$$

The common signal S is used to calculate 40 the value of function F3(S). In the simple four color OLED example, function F3 is simply the identity function. The output of function F3 is assigned to the output signal W 42, which is the color signal for the additional primary W. The four color output signals in this example are intensities and may be combined into a four-value vector (R',G',B',W), or in general $(I_1',I_2',I_3',I_4')$. The 3×4 phosphor matrix M4 times this vector shows the XYZ tristimulus values that will be produced by the display device:

$$M4 \times \begin{bmatrix} I_1' \\ I_2' \\ I_3' \\ I_4' \end{bmatrix} = \begin{bmatrix} X \\ Y \\ Z \end{bmatrix}$$

When, as in this example, function F1 chooses the minimum non-negative signal, the choice of functions F2 and F3 determine how accurate the color reproduction will be for in-gamut colors. If F2 and F3 are both linear functions, F2 having negative slope and F3 having positive slope, the effect is the subtraction of intensity from the red, green, and blue primaries and the addition of intensity to the additional primary. Further, when linear functions F2 and F3 have slopes equal in magnitude but opposite in sign, the intensity subtracted from the red, green, and blue primaries is completely accounted for by the intensity assigned to the additional primary, preserving accurate color reproduction and providing luminance identical to the three color system.

If instead the slope of F3 is greater in magnitude than the slope of F2, system luminance will be augmented and color accuracy will degrade, decreasing saturation. If instead the slope of F3 is lesser in magnitude than the slope of F2, system luminance will be diminished and color accuracy will degrade, increasing saturation. If functions F2 and F3 are non-linear functions, color accuracy may still be preserved, providing F2 is decreasing and F2 and F3 are symmetric about the independent axis.

In any of these situations, functions F2 and F3 may be designed to vary according to the color represented by the color input signals. For example, they may become steeper as the luminance increases or the color saturation decreases, or they may change with respect to the hue of the color input signal (R,G, B). There are many combinations of functions F2 and F3 that will provide color accuracy with different levels of utilization of the additional primary with respect to the gamut-defining primaries. Additionally, combinations of functions F2 and F3 exist that allow a trade of color accuracy in favor of luminance. Choice of these functions in the design or use of a display device will depend on its intended use and specifications. For example, a portable OLED display device benefits greatly in terms of power efficiency, and thus battery life, with maximum utilization of an additional primary having a higher power efficiency than one or more of the gamut defining primaries. Use of such a display with a digital camera or other imaging device demands color accuracy as well, and the method of the present invention provides both.

The normalization steps allow for accurate reproduction of colors within the gamut of the display device regardless of the color of the additional primary. In the unique case where the color of the additional primary is exactly the same as the display white point, these normalization steps reduce to identity functions. In any other case, the amount of color error introduced by ignoring the normalization steps depends largely on the difference in color between the additional primary and the display white point.

Normalization is especially useful in the transformation of color signals for display in a display device having an additional primary outside the gamut defined by the gamut-defining primaries. Returning to FIG. 1, the additional primary 12 is shown outside the gamut 8. Because it is out of gamut, reproduction of its color using the red, green, and blue primaries would require intensities that exceed the range [0,1]. While physically unrealizable, these values may be used in calculation. With additional primary chromaticity coordinates (0.4050, 0.1600), the intensity required of the green primary is negative, but the same relationship shown earlier can be used to normalize the intensities:

$$\begin{bmatrix} 1.000 & 0 & 0 \\ 0 & -1.411 & 0 \\ 0 & 0 & 1.543 \end{bmatrix} \times \begin{bmatrix} R \\ G \\ B \end{bmatrix} = \begin{bmatrix} Rn \\ Gn \\ Bn \end{bmatrix}$$

A color outside the gamut of the red, green, and blue primaries, specifically between the red-blue gamut boundary and the additional primary, will call for negative intensity for the green primary and positive intensities for the red and blue primaries. After this normalization, the red and blue values are negative, and the green value is positive. The function F1 selects the green as the minimum non-negative value and the green is replaced in part or in total by intensity from the additional primary. The negatives are removed after the additional primary intensity is calculated by undoing the normalization (i.e. renormalizing):

$$\begin{bmatrix} 1.000 & 0 & 0 \\ 0 & -0.709 & 0 \\ 0 & 0 & 0.648 \end{bmatrix} \times \begin{bmatrix} Rn' \\ Gn' \\ Bn' \end{bmatrix} = \begin{bmatrix} R' \\ G' \\ B'^{\wedge} \end{bmatrix}$$

The normalization steps preserve color accuracy, clearly allowing white, near-white, or any other color to be used as an additional primary in an additive color display. In OLED displays, the use of a white emitter near but not at the display white point is very feasible, as is the use of a second blue, a second green, a second red, or even a gamut-expanding emitter such as yellow or purple.

Savings in cost or in processing time may be realized by using signals that are approximations of intensity in the calculations. It is well known that image signals are often encoded non-linearly, either to maximize the use of bit-depth or to account for the characteristic curve (e.g. gamma) of the display device for which they are intended. Intensity was previously defined as normalized to unity at the device white point, but it is clear, given linear functions in the method, that scaling intensity to code value 255, peak voltage, peak current, or any other quantity linearly related to the luminance output of each primary is possible and will not result in color errors.

Figure 3:
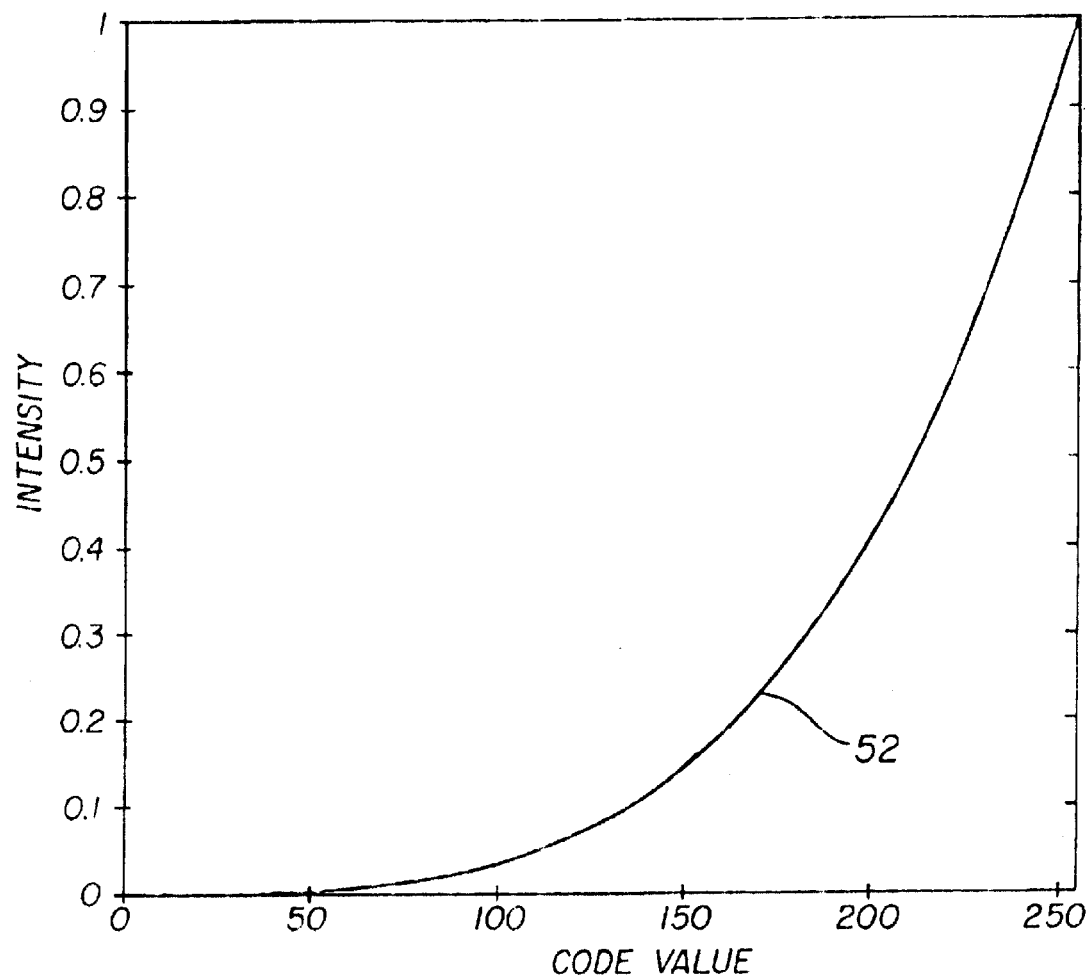
FIG. 3 is a diagram of a typical display device luminance intensity response curve.

Approximating intensity by using a non-linearly related quantity, such as gamma-corrected code value, will result in color errors. However, depending on the deviation from linearity and which portion of the relationship is used, the errors might be acceptably small when considering the time or cost savings. For example, FIG. 3 shows the characteristic curve for an OLED, illustrating its non-linear intensity response to code value. The curve has a knee 52 above which it is much more linear in appearance than below. Using code value to approximate intensity is probably a bad choice, but subtracting a constant (approximately 175 for the example shown in FIG. 3) to use the knee 52 shown, from the code value makes a much better approximation. The signals (R,G,B) provided to the method shown in FIG. 2 are calculated as follows:

$$\begin{bmatrix} Rcv \\ Gcv \\ Bcv \end{bmatrix} - 175 = \begin{bmatrix} R \\ G \\ B \end{bmatrix}$$

The shift is removed after the method shown in FIG. 2 is completed by using the following step:

$$\begin{bmatrix} R' \\ G' \\ B' \end{bmatrix} + 175 = \begin{bmatrix} Rcv' \\ Gcv' \\ Bcv' \end{bmatrix}$$

This approximation may save processing time or hardware cost, because it replaces a lookup operation with simple addition.

Utilizing the method shown in FIG. 2 to transform three color input signals to more than four color output signals requires successive application of the method shown in FIG. 2. Each successive application of the method calculates the signal for one of the additional primaries, and the order of calculation is determined by the inverse of a priority specified for the primary. For example, consider an OLED display device having the red, green, and blue primaries already discussed, having chromaticities (0.637, 0.3592), (0.2690, 0.6508), and (0.1441, 0.1885) respectively, plus two additional primaries, one slightly yellow having chromaticities (0.3405, 0.3530) and the other slightly blue having chromaticities (0.2980, 0.3105). The additional primaries will be referred to as yellow and light blue, respectively.

Prioritizing the additional primaries may take into account luminance stability over time, power efficiency, or other characteristics of the emitter. In this case, the yellow primary is more power efficient than the light blue primary, so the order of calculation proceeds with light blue first, then yellow. Once intensities for red, green, blue, and light blue have been calculated, one must be set aside to allow the method to transform the remaining three signals to four. The choice of the value (X) to set aside may be arbitrary, but is best chosen to be the signal which was the source of the minimum calculated by function F1. If that signal was the green intensity, the method calculates the yellow intensity based on the red, blue, and light blue intensities. All five are brought together at the end: red, green, blue, light blue, and yellow intensities for display. A 3×5 phosphor matrix may be created to model their combination in the display device. This technique may easily be expanded to calculate signals for any number of additional primaries starting from three input color signals.

Figure 4:
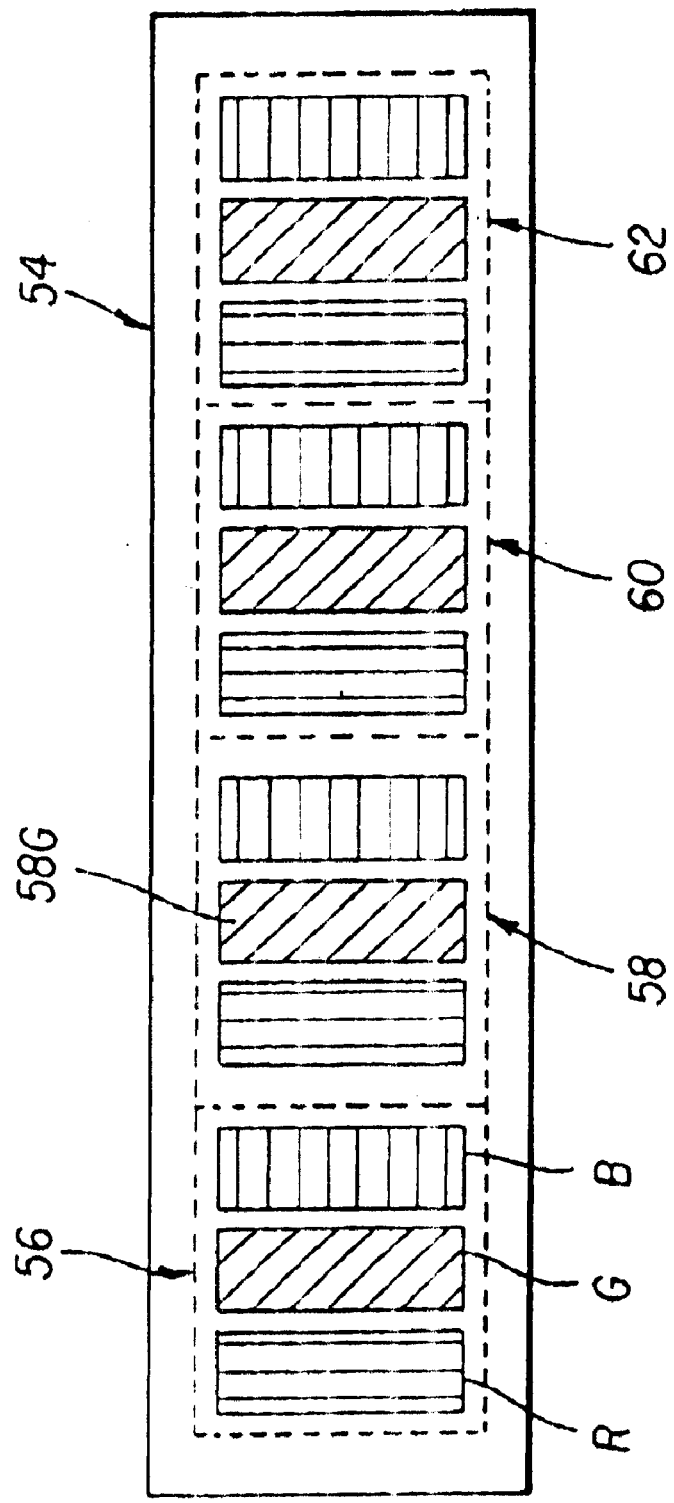
FIG. 4 is a drawing of a typical prior art red, green, blue stripe arrangement of light emitting elements.

While this method provides an accurate method of converting from a three-color input signal to a four or more color signal when the input data is sampled for a display with spatially overlapping light emitting elements, the color and luminance distribution along edges can be disrupted when the input signal has been sampled for display on a display with non-overlapping light emitting elements. For example, a three color input signal may be intended to display an edge on a pixel pattern as shown in FIG. 4. This figure shows a portion of a display device 54 containing four pixels (56, 58, 60 and 62), each consisting of a repeating pattern of red R, green G and blue B light emitting elements. These four pixels may be used, for example, to display a step edge that is centered on the second green light emitting element 58G and result in a intensity distribution for each color as shown in FIG. 5.

Figure 5:
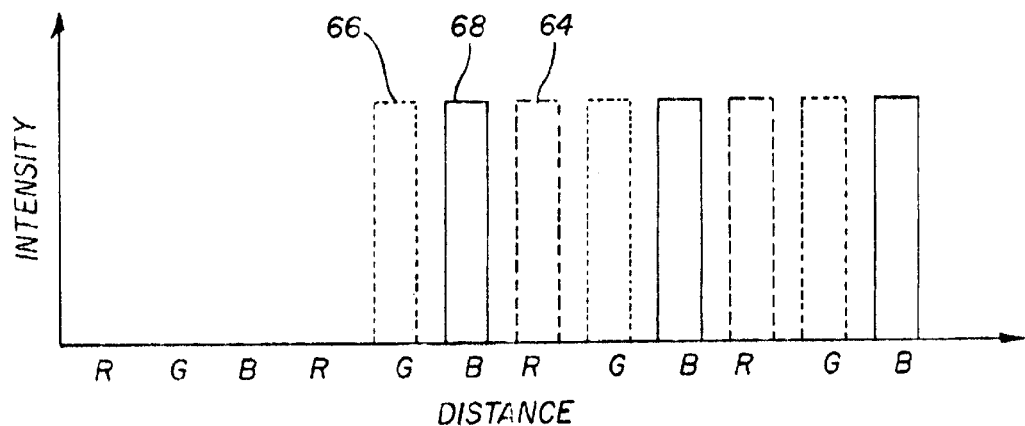
FIG. 5 is a diagram showing intensity when a step edge, which is centered on the second green light emitting element, is displayed on the RGB stripe arrangement of light emitting elements.
Figure 6:
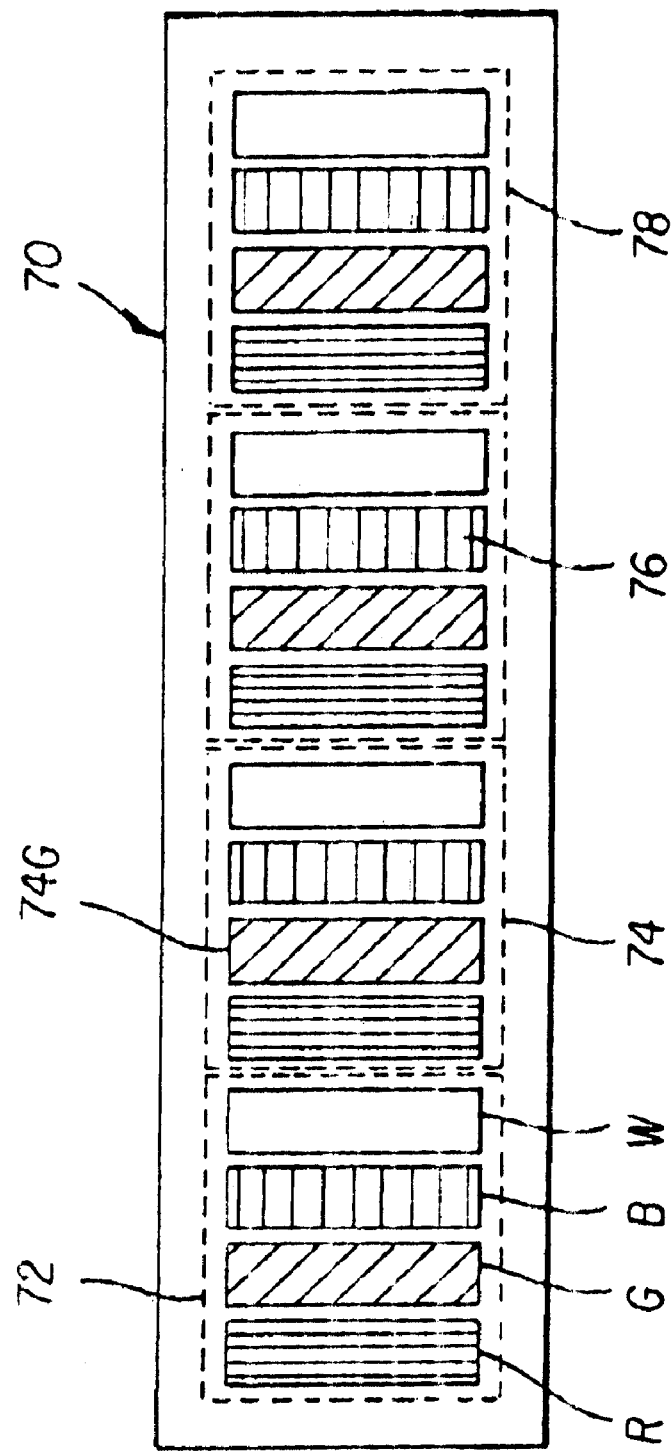
FIG. 6 is a drawing of a typical red, green, blue, white stripe arrangement of light emitting elements.

FIG. 5 shows red 64, green 66, and blue 68 intensities for a step edge that is centered on the second green light emitting element 58G in FIG. 4. When a four color conversion algorithm is applied, the image is displayed on a four element display device, such as the one shown in FIG. 6. This figure shows a display device 70 with four pixels (72, 74, 76 and 78) each consisting of red R, green G, blue B, and white W light emitting elements. When an algorithm, such as the one shown in FIG. 2 is applied to a three color signal, containing a step edge, such as the one shown in FIG. 5, and displayed on the four color display device 70 shown in FIG. 6, the resulting signal will appear as shown in FIG. 7.

Figure 7:
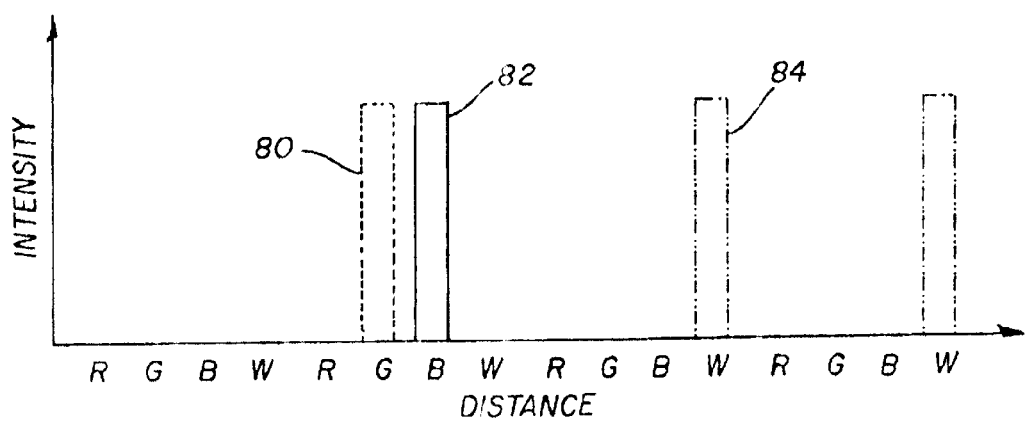
FIG. 7 is a diagram showing intensity when the step edge is converted to a red, green, blue, white signal using the method shown in FIG. 2.

As shown in FIG. 7, the resulting image of the step edge, will consist of the green 80 and blue 82 signals in the second pixel 74 and white 84 signals in the third 76 and fourth 78 pixels. Notice that the color of the second pixel 74 will be cyan despite the fact that the step edge is intended to be neutral in color. At the proper resolution, the resulting image will appear to have a cyan fringe along the left side of the edge and a red fringe at the other end of the edge (not shown). A similar phenomenon may result in a visible fringe or jittering edge if a moving image is being displayed. To avoid these problems and improve the luminance distribution along the edge, the method shown in FIG. 2 may be modified to smooth the transition of the common signal S that was calculated 28 earlier.

Figure 8:
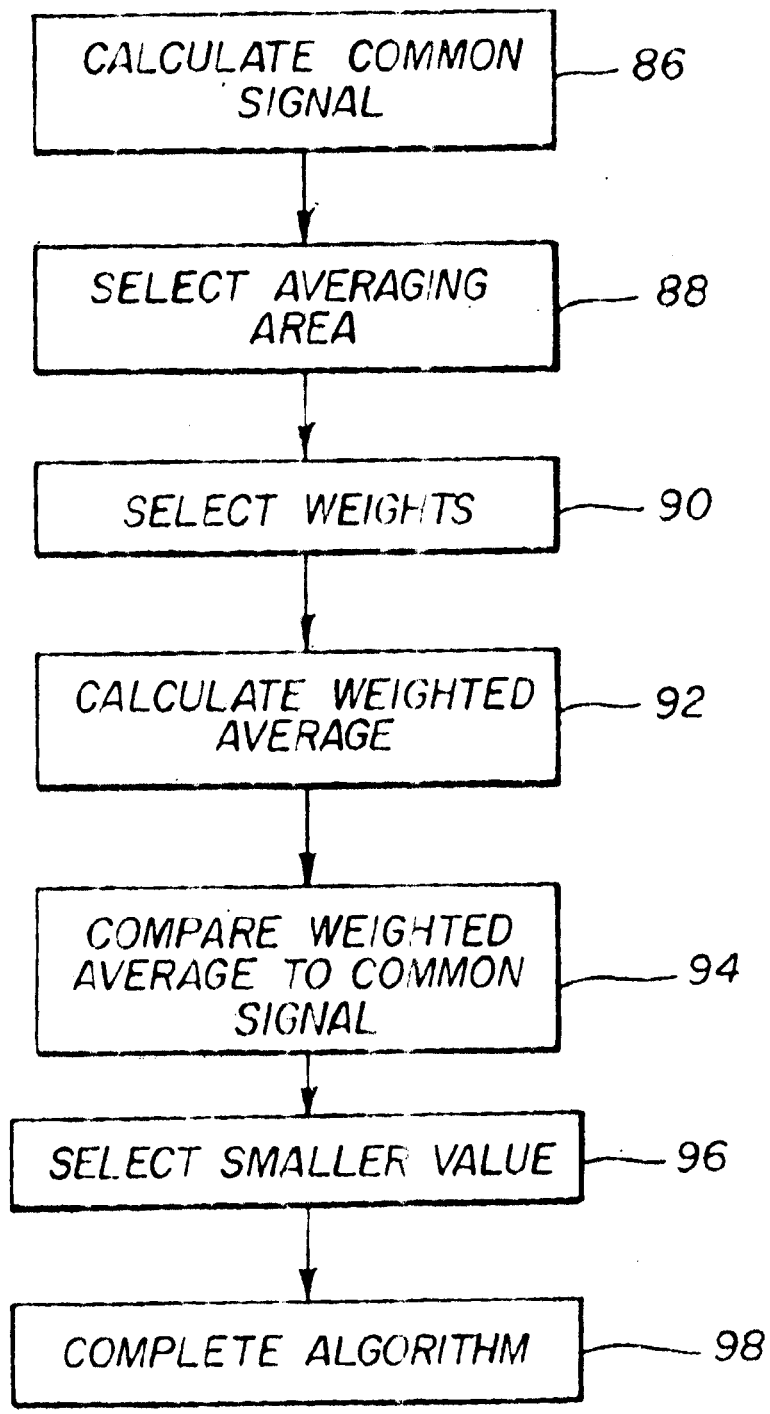
FIG. 8 is a flow diagram illustrating additional steps in the method of the present invention.

A flow diagram showing the method of the present invention is shown in FIG. 8. As shown in this figure, the common signal is calculated 86 (steps 22 through 26 shown in FIG. 2) for a plurality of pixels. Neighboring pixels are then selected 88 for inclusion into a weighted average. Weighting values are then selected 90. A weighted average of this common signal is then computed 92 for the current pixel and one or more neighboring pixels. Preferably, this weighted average would consist of neighboring pixels that include at least one pixel to the left and one pixel to the right of the current pixel in the direction that the light emitting elements R, G, and B in pixels 56, 58, and 60 are displaced from one another. However the term "neighboring pixels" might also include more than one pixel to either side of the current pixel and may also include pixels oriented along other axes, such as orthogonal or diagonal. For example, employing the common signal S or one pixel to either side of the current pixel, one might employ the equation:

$$S'_c = w_1 S_{(c-1)} + w_2 S_{(c)} + w_3 S_{(c+1)}$$

to calculate the final common signal S' for the current pixel c. Where $S'_c$ is the weighted average of the common signals S from pixels c−1, c, and c+1 and the weights ($w_1$, $w_2$, and $w_3$) are constants that typically sum to 1 and might include values such as 0.25, 0.5, and 0.25, respectively.

While the weights as discussed in this example may be constants, the weights may also be selected based on the direction of signal change. For example, the common signal may be compared between one or more pixels on either side of the current pixel. The smaller of the two common signals may then be selected and a larger weighting value applied to the smaller common signal value.

Figure 9:
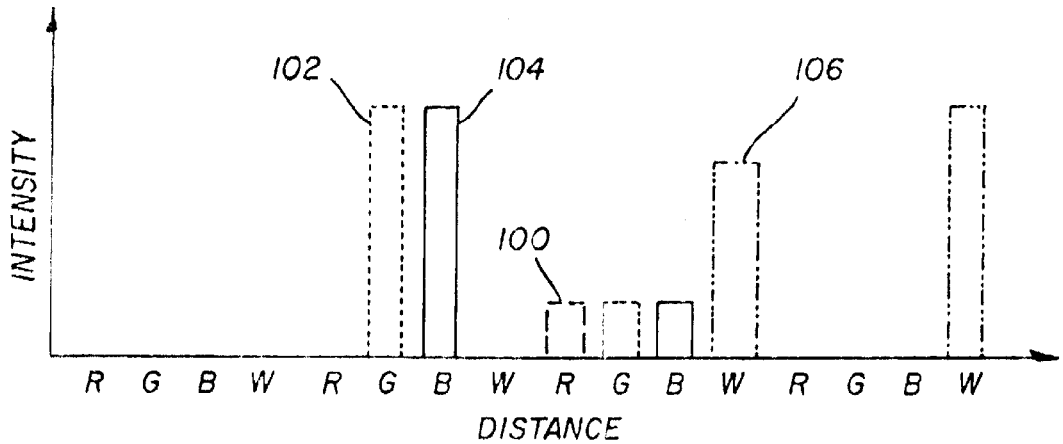
FIG. 9 is a diagram showing intensity when the step edge is converted using the additional steps of the present method shown in FIG. 8.

Optionally, the original common signal $S_c$ for the current pixel c and the modified common signal $S'_c$ are then compared 94 and the minimum of these two values is selected 96 to be used in place of the common signal S that was calculated 26 earlier. Once the final common signal has been calculated, the remaining steps (28 through 42) in FIG. 2 are then completed 98 using this common signal. When this algorithm is applied to the three color input signal in FIG. 5 assuming constant weights of 0.25, 0.5, and 0.25, the signal shown in FIG. 9 results. As shown in this figure, the resulting signal contains a red signal 100 for pixel 76, a green signal 102 for pixels 74 and 76, a blue signal 104 for pixels 74 and 76, and white signal 106 for pixels 76 and 78. Because some red energy is present in pixel 76, the cyan fringe along the leading edge of the step edge is reduced in visibility. Therefore this method reduces the visibility of fringing. Additionally, when showing a moving edge, the transition between light emitting elements will be smoothed, reducing the appearance of jitter along edges.

Figure 10:
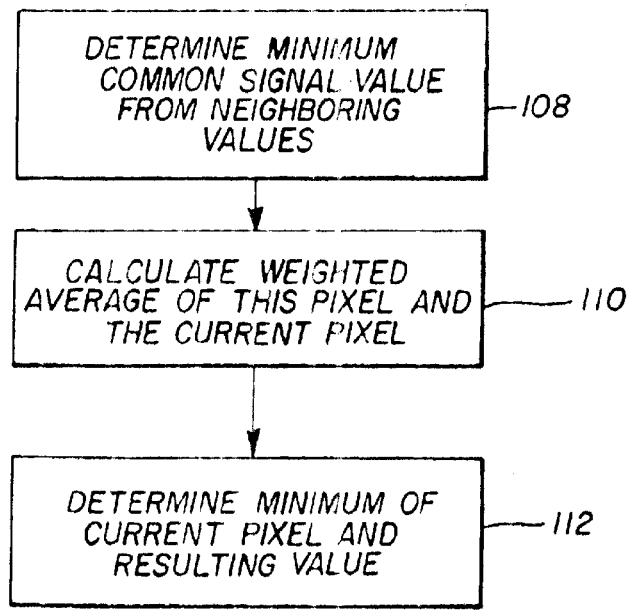
FIG. 10 is a flow diagram illustrating alternate additional steps in the method of the present invention.
Figure 11:
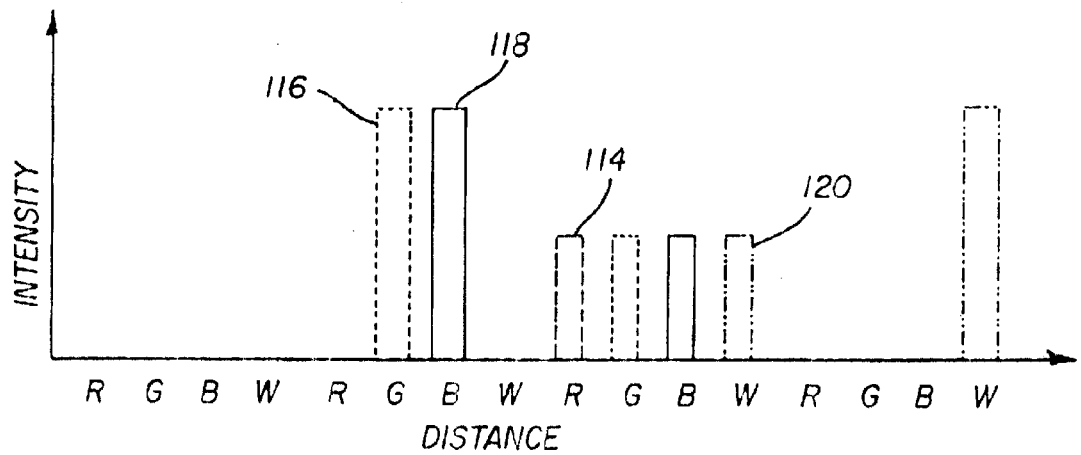
FIG. 11 is a diagram showing intensity when the step edge is converted using the additional steps of the present method shown in FIG. 10.

Alternative methods may also be devised. For example, steps 88 through 96 in FIG. 8 may be replaced by the steps shown in FIG. 10. As shown in FIG. 10, the minimum of the common signal is determined 108 for the relevant neighboring pixels. A weighted average is calculated 110 using this minimum value and the common signal for the current pixel. Finally, a minimum of the original common signal for the current pixel and the value calculated in step 110 is determined 112. As with the previous method, this method reduces the visibility of fringing or jittering artifacts along the edge. FIG. 11 shows the resulting signal when equal weights are applied in step 110. Once again, this signal contains a red signal 114 for pixel 76, a green signal 116 for pixels 74 and 76, a blue signal 118 for pixels 74 and 76, and a white signal 120 for pixels 76 and 78. As before, the presence of the red signal 114 in pixel 76 reduces the visibility of cyan fringing along the step edge.

A simplification of this method is to simply calculate the minimum common signal that was calculated 28 earlier across the neighboring and current pixel and apply this minimum value as the common signal for the current pixel. This is equivalent to applying weights in the weighted average step 110 that is 1.0 for the minimum signal that is determined 108 for the relevant neighboring pixels.

Figure 12:
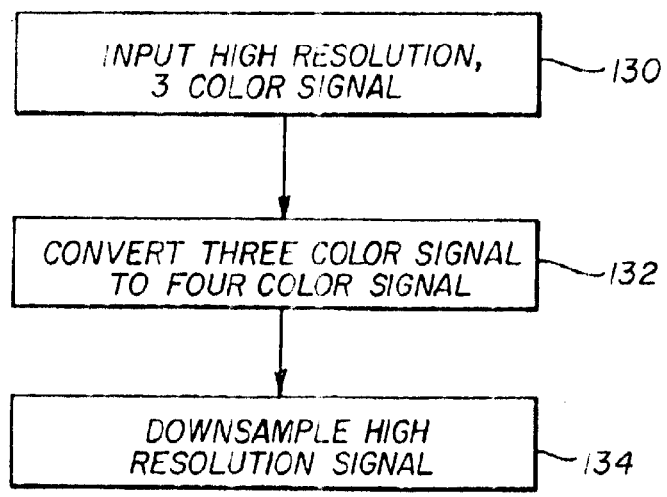
FIG. 12 is a flow diagram illustrating typical processing steps in a system employing a three to four color conversion process according to the prior art.

While this method has the advantage of reducing color fringing and other related imaging artifacts, the primary advantage of this method is not the improvement in quality but the simplified image processing chain that this algorithm enables. A typical image processing chain that includes conversion of a three color input signal to a four color signal is shown in FIG. 12. As shown in this figure, a high resolution three color signal may be input 130 to the display system. This signal will ideally represent n pixels of data where 3n is the number of light emitting elements on the display device. This signal may then be converted 132 to a four color signal for each of the 3n signal values, resulting in 4n values. Finally, the signal may be down sampled 134 from 4n values to 4/3n values, such that there is one color value for each light emitting element.

To reduce the number of processing steps and the processing power necessary to conduct these steps, steps 132 and 134 would ideally be reversed. However, when the color conversion process shown in FIG. 2 is applied, color fringing and other related artifacts can result. However, when the common signal is either smoothed or minimized, steps 132 and 134 can be reversed without the presence of these artifacts. In this case, the color conversion process 132 must only be conducted for n signal values. Further, the down sampling step 134 reduces the n signal values to 4/3n values. As such, a lower powered and lower cost processor may be applied to complete the necessary processing steps.

The invention has been described in detail with particular reference to certain preferred embodiments thereof, but it will be understood that variations and modifications can be effected within the spirit and scope of the invention.

PARTS LIST 2 red primary chromaticity
4 green primary chromaticity
6 blue primary chromaticity
8 gamut triangle
10 additional in-gamut primary chromaticity
12 additional out-of-gamut primary chromaticity
22 input signals for gamut-defining primaries
24 calculate additional primary normalized signals step
26 signals normalized to additional primary
28 calculate function F1, common signal step
30 calculate function F2 of common signal step
32 addition step
34 output signals normalized to additional primary
36 calculate white-point normalized signals step
40 calculate function F3 of common signal step
42 output signals for additional primary
52 knee of curve
54 display device
56 pixels
58 pixels
60 pixels
62 pixels
64 red intensity
66 green intensity
68 blue intensity
70 display device
72 pixels
74 pixels
76 pixels 78 pixels
80 green signal
82 blue signal
84 white signal
86 calculate common signal step
88 select pixels step
90 select weighting values step
92 compute weighted average step
94 compare step
96 select value step
98 end
100 red signal
102 green signal
104 blue signal
105 white signal
108 determine common signal step
110 calculate weighted average step
112 determine minimum step
114 red signal
116 green signal
118 blue signal
120 white signal
130 input color signal step
132 convert step
134 down sample step

What is claimed is:

1. A method for transforming three color input signals (R, G, B) corresponding to three gamut defining color primaries to four color output signals (R', G', B', W) corresponding to the gamut defining color primaries and one additional color primary W for driving a display having emitters that emit light corresponding to the four color output signals, comprising:

a) calculating a common signal value S as a function F1 of the three color input signals (R,G,B) for a current and neighboring pixels;

b) determining a final common signal value S' based upon the common signal for the current and neighboring pixels;

c) calculating the three color signals (R',G',B') by calculating a value of a function F2 of the final common signal value S' and adding it to each of the three color input signals (R,G,B); and d) calculating the output signal W as a function F3 of the final common signal value S'.

2. The method claimed in claim 1, wherein the step of determining the final common signal S' comprises calculating a weighted average of the common signals S for the current and neighboring pixels.

3. The method claimed in claim 1, wherein the step of determining the final common signal S' comprises determining the minimum of the common signals S for the current pixel and selected neighboring pixels.

4. The method claimed in claim 1, wherein the step of determining the final common signal value S' includes:

b1) determining a minimum common signal value for the neighboring pixels;

b2) calculating a weighted average of the minimum common signal value and the common signal value S for the current pixel; and b3) determining S' as the minimum of the weighted average and the common signal S for the current pixel.

5. The method claimed in claim 1, wherein the function F1 is the minimum of the color input signals (R,G,B).

6. The method claimed in claim 1, wherein the calculated value of function F2 is negative.

7. The method claimed in claim 1, wherein functions F2 and F3 are linear functions.

8. The method claimed in claim 7, wherein the values of functions F2 and F3 have opposite signs.

9. The method claimed in claim 1, wherein the functions F2 and F3 increase in slope with decreasing color saturation represented by color input signals (R,G,B).

10. The method claimed in claim 1, wherein the functions F2 and F3 increase in slope with increasing luminance represented by color input signals (R,G,B).

11. The method claimed in claim 1, wherein the functions F2 and F3 are nonlinear, having a smaller slope when the final common signal S' is high.

12. The method claimed in claim 1, wherein the functions F2 and F3 vary according to the hue represented by the color input signals (R,G,B).

13. The method claimed in claim 1, wherein the color input signals (R,G,B) are non-linearly related to intensities of their corresponding primaries.

14. The method claimed in claim 13, further comprising the steps of shifting the values of the color input signals by an amount to better approximate linearity with intensity, and shifting the values of the three color output signals (R', G', B') by a negative of the amount that the values of the input color signals were shifted.

15. The method claimed in claim 1, wherein the display has one or more further emitters corresponding to additional color primaries, and further comprising the steps of:

e) setting aside one of the four color output signals (R', G', B', W) and further transforming the remaining three color output signals to four additional color output signals (A', B', $C_1$, $W_2$), where A', B,' and C' are the remaining three further transformed color output signals and $W_2$ corresponds to a signal for driving a further additional color primary, by applying steps a through d, wherein the three of the four color output signals are treated as the three color input signals and $W_2$ is treated as W, and driving the display with (X, A',B'C',W2), where X is the color output signal that was set aside in the further transformation; and f) repeating the further transformation for any number of additional color primaries.

16. The method claimed in claim 15, wherein the choice of the color output signal that is set aside depends on the relative power efficiencies of the emitters in the display.

17. The method claimed in claim 1, further comprising;

e) normalizing the color input signals (R,G,B) such that a combination of equal amounts in each signal produces a color having XYZ tristimulus values identical to those of the additional color primary to produce normalized color input signals (Rn,Gn,Bn) and using the normalized color input signals in steps a) and c) to calculate the common signal values and the three color signals (R'G'B'); and f) renormalizing the three color signals (R',G',B') such that a combination of equal amounts in each signal produces a color having XYZ tristimulus values identical to those of the display white point.

* * * * *

UNITED STATES PATENT AND TRADEMARK OFFICE
CERTIFICATE OF CORRECTION

PATENT NO. : 6,885,380 B1
DATED : April 26, 2005
INVENTOR(S) : Bruno Primerano et al.

It is certified that error appears in the above-identified patent and that said Letters Patent is hereby corrected as shown below:

Column 14,
Line 35, replace "signals (A', B' $C_1$, $W_2$)" with -- signals (A', B', C', $W_2$) --.

Signed and Sealed this

Twenty-first Day of February, 2006

JON W. DUDAS
*Director of the United States Patent and Trademark Office*